(No Model.) W. H. BAUSH. 2 Sheets—Sheet 2.
DRILLING MACHINE.

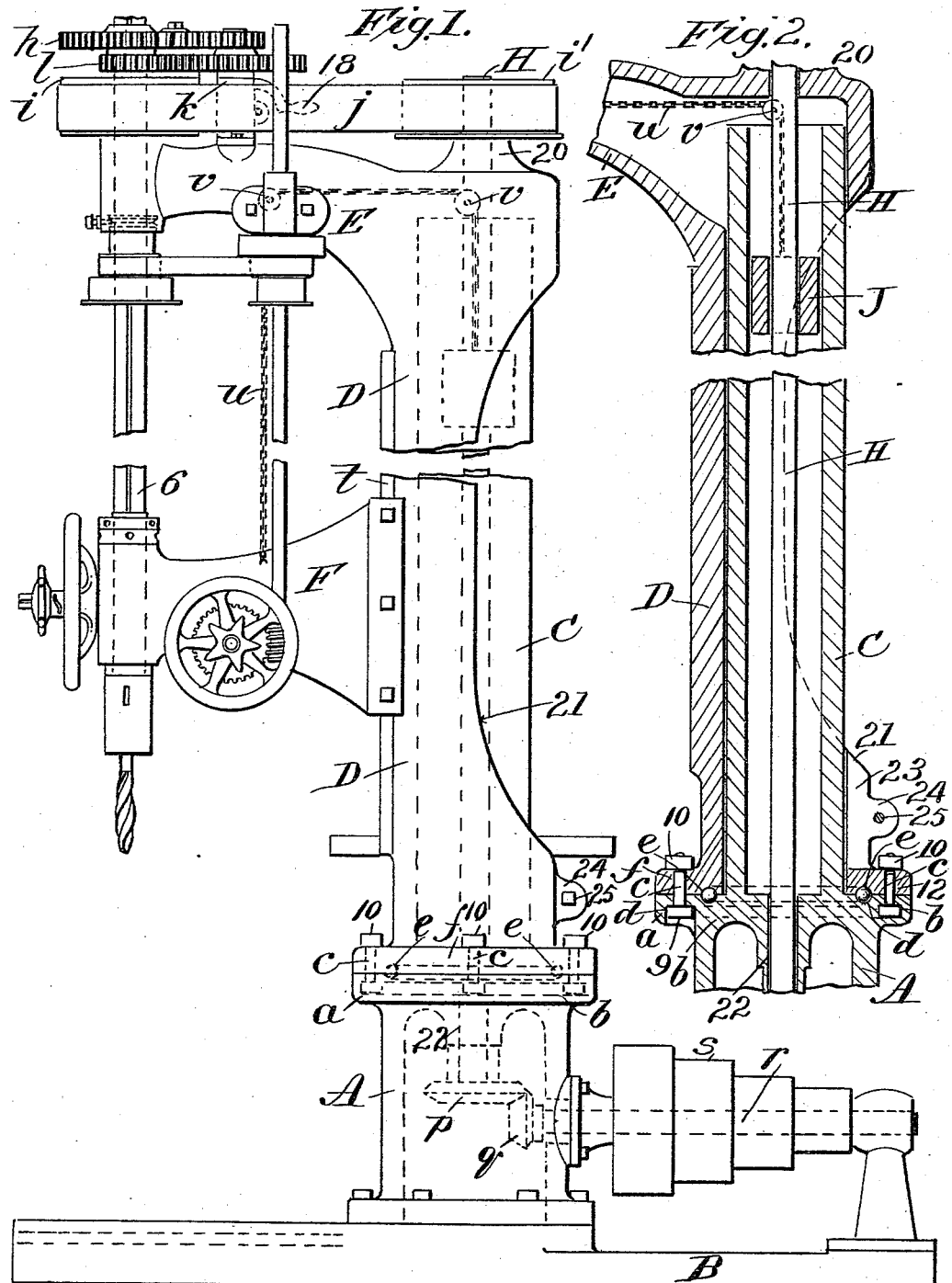

No. 457,756. Patented Aug. 11, 1891.

Witnesses:
J. R. Garfield
W. Mullins

Inventor
Wm. H. Baush,
by Chapin & Co.
Atty's.

UNITED STATES PATENT OFFICE.

WILLIAM H. BAUSH, OF HOLYOKE, MASSACHUSETTS, ASSIGNOR TO C. H. BAUSH & SONS, OF SAME PLACE.

DRILLING-MACHINE.

SPECIFICATION forming part of Letters Patent No. 457,756, dated August 11, 1891.

Application filed January 7, 1891. Serial No. 377,066. (No model.)

*To all whom it may concern:*

Be it known that I, WILLIAM H. BAUSH, a citizen of the United States, residing at Holyoke, in the county of Hampden and State of Massachusetts, have invented new and useful Improvements in Drilling-Machines, of which the following is a specification.

The present invention relates to improvements in power-driven drilling-machines, which may be termed "upright radial drills," and has for its object the provision of a machine (wherein the spindle is vertically disposed and is capable of being revolved about a vertical axis, so that the drilling may be effected in a line which perpendicularly intersects any radial line from said center of revolution) which is unusually simple and strong, easy of operation, and adaptable for employment on both heavy and light work, and is otherwise unusually efficient, as will hereinafter more fully appear.

The invention consists in the construction and combination of parts, substantially as will be now described, and finally pointed out in the claims.

Figure 4:
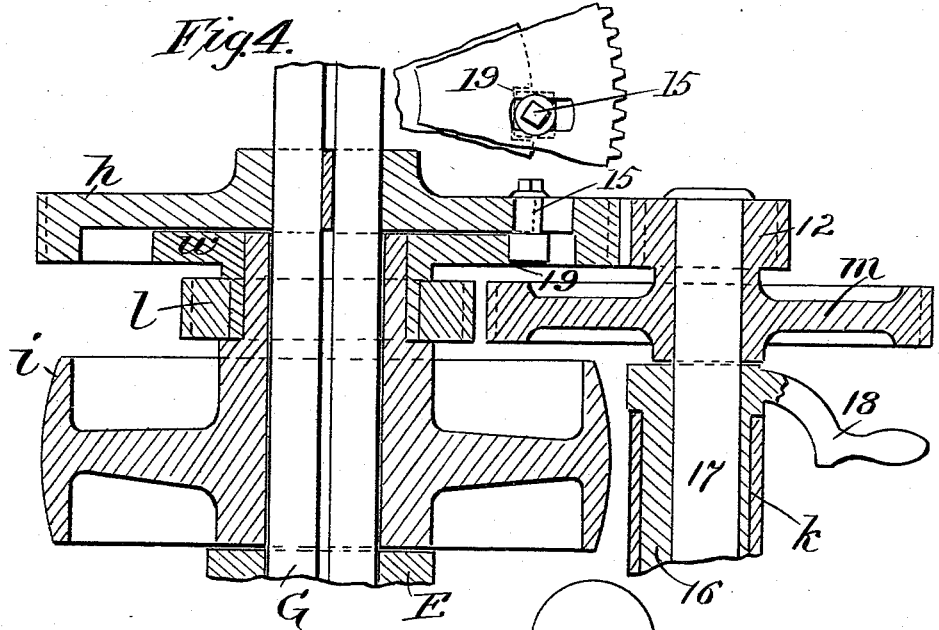
Figure 5:
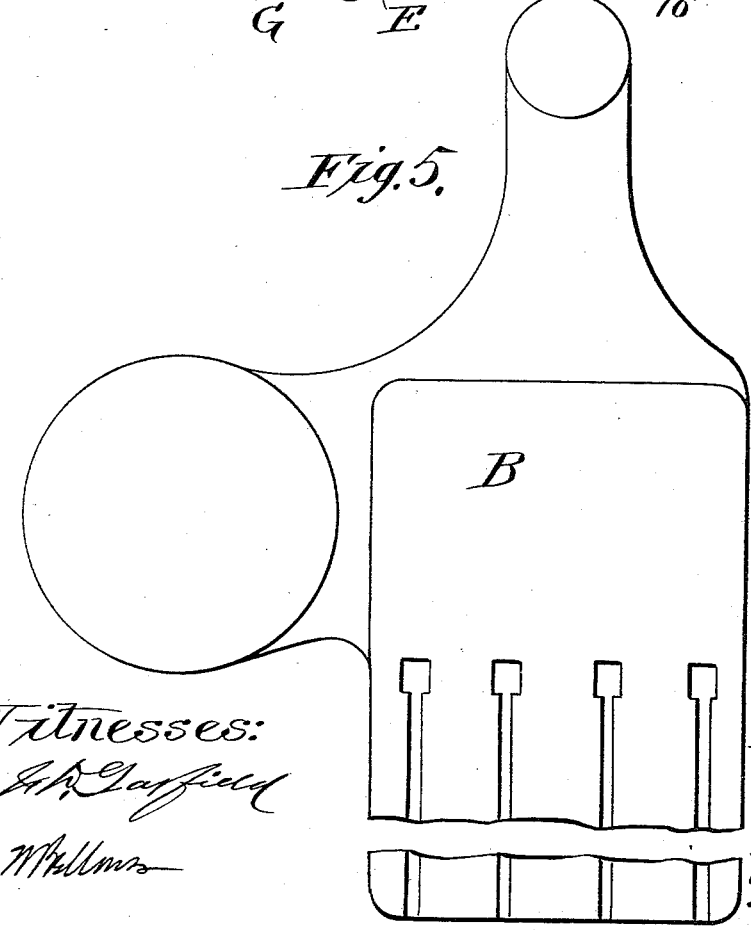

Reference is to be had to the accompanying drawings, in which Figure 1 is a side elevation of the improved drill. Fig. 2 is a vertical sectional view of parts shown in said Fig. 1. Fig. 3 is a view in perspective and section to illustrate the construction of the upper portion of the base-upright. Fig. 4 is a vertical sectional view on a large scale of the "back gearing." Fig. 5 is a plan view of the foot-plate of the machine.

In the drawings, A represents a base-standard rising above and formed on or secured to the foot-plate B, said base-standard being made hollow and outwardly flanged at its upper side, as at $a$, and is provided with an upwardly-extended pillar C of cylindrical form, which is formed as an axial continuation of said base-standard. $b$ represents an annular and practically-closed passage in said flange to receive the heads of bolts $c$, a hole 9 being formed from the under side of said flange, which leads upward to said passage, whereby the bolts may be entered. In the top of the flange is a groove $d$, which is half-round in cross-section to form in part a raceway for the anti-friction balls $e$, the raceway being formed, as to the other wall thereof, by the correspondingly-formed groove in the under side of the flange $f$, formed on the sleeve D. The bolts 8 pass upwardly through the said sleeve-flange $f$, receiving the nuts 10 at their upper ends. The bolts may, when the nuts thereon are unloosened, be moved around with the sleeve D, their shanks passing freely around in the annular slot 12, (see Fig. 3 particularly,) which is in communication with the said passage $b$, and the sleeve freely rotates on the balls at its lower end and has a long vertical bearing on the extended cylindrical pillar. The sleeve at its upper end is formed with the angular and horizontal extension, constituting the upper head E, while the lower head F, carrying the drill-spindle G, is fitted to slide up and down on vertical ways $t$, formed on the side of the sleeve. The drill-spindle which moves up and down with the said head F is driven through means of the spline-connected gear $h$ above the pulley $i$, supported on the upper head, which pulley $i$ is driven by the belt $j$, and is usually, in the use of the drill, connected to move as one with the gear $h$ and disk $w$ through means of the locking-stud 15.

$l$ represents another and smaller gear under the one $h$, which is fixed to move as one with the disk $w$ and pulley $i$.

$k$ represents a socket-bearing on the head E, within which is set the bearing-hub 16, having eccentrically therein the opening within which fits the bearing-stud 17, and said eccentric part is provided with a handle-lever 18 for conveniently turning it. The said stud forms the bearing for the larger gear $m$, which may mesh with the gear $l$, and also for the smaller gear $n$, which may mesh with the splined gear $h$.

On desiring to insure the most rapid rotation of the drill-spindle the pulley is interlocked with the disk $w$, as indicated in Fig. 4, by the sliding of the stud 15, so that it engages with the notch 19 in the disk, the gears $m$ and $n$ being thrown back out of engagement with the gears $l$ and $h$. On desiring to gear back to secure a slower rotation of the drill-spindle the stud 15 is slid so that the direct connection between the disk as well as the pulley $i$, which is fixed thereto, and the splined gear $h$ is broken, the pulley then rotating free on the drill-spindle, and by turning the eccentric the gears $m$ and $n$ are put into mesh with the gears $l$ and $h$, and the less rapid rotation of the spindle is insured. Of course it has already been observed that the belt $j$ is around a pulley $i'$, fixed on the upper end of the vertical shaft H, which has a bearing at 20 centrally in the upper portion of the sleeve D and at 22 in the hub of the hollow base-standard A. The said shaft on its lower end carries a bevel-gear $p$, with which engages a similar gear $q$, located within the hollow base-standard and mounted on the end of the horizontal shaft $r$, on which are the cone-pulleys $s$.

The sleeve is shown as cut out at its back side, as at 21, for the purpose of avoiding unnecessary weight, and is split, as at 23, and adjacent the cleft provided with ear-pieces 24 24, through and with which engages a bolt 25 for contracting the sleeve so that wear between the sleeve and pillar may be taken up.

The mechanism for securing the vertical feed movement of the spindle-carrying head F, which head is guided on a way $t$ of the sleeve, is indicated in the drawings, but a detailed description thereof is deemed unnecessary herein, as the same does not form any part of the subject-matter of this application for Letters Patent.

The counter-weight J is located and movable within the pillar C, and is vertically apertured for the passage therethrough of the shaft H. The chains $u$ or other form of flexible connections are attached to both the said head and the counter-weight and are intermediately sustained and guided on the sheaves $v$, mounted within the extension-head, which is hollow, the same in practice being integrally cast with the sleeve by being properly cored out.

A feature of much practical advantage which prevails in the present drilling-machine consists in the provision and mounting of the head carrying a vertical drill-spindle on a sleeve which is supported on the base of the machine and which embraces and has an extended bearing upon and is capable of rotation about a pillar which is a vertical extension of said base, for thereby it is possible to drill perpendicularly to and to intersect any radial line which may be produced from the axis of said pillar, and in such drill there is a maximum of strength and rigidity which is not inconsistent with lightness.

What I claim as my invention is—

1. In a drill, the combination, with a base provided with a cylindrical pillar, of a sleeve having its bottom supported on said base and encircling and having a bearing on said pillar and adapted for rotation thereon, said sleeve being split and provided with a contracting device, and also having an extension or head which carries a drill-spindle that is in axial parallelism with the pillar, substantially as described.

2. In a drill, the combination, with the base provided with the flange having the annular passage $b$ and the annular slot, and also supporting the cylindrical column, of the sleeve D, flanged at its bottom and resting on said base, the bolts having their heads lying in said passage, their shanks passing through said slot and through holes therefor in said flanged sleeve-base and the locking-nuts, a raceway and balls between said sleeve and base, and a head sustained on said sleeve, which carries the drill-spindle, substantially as described.

3. In a drill, the combination, with a base provided with a cylindrical and hollow pillar, of a sleeve by its bottom supported on said base and encircling and having a bearing for rotation on said pillar and carrying a head-extension E and also a head F, which is movable and vertically guided on the said sleeve, and the drill-spindle in axial parallelism with said pillar and supported on said head, a counter-weight fitting in said hollow pillar, and the flexible connections connected to said weight and said head F and intermediately supported and guided on the said head E, substantially as described.

4. In a drill, the combination, with the hollow base A, having at its upper portion a central bearing, and the hollow cylindrical pillar C, of the sleeve D, having its bottom resting on said base and encircling and rotatable on said pillar and having the head E, the head F, movable and vertically guided on said sleeve and carrying the drill-spindle, the vertical shaft H, having a bearing in said base and also in the upper portion of said sleeve, and driving connections for same, and connection mechanism between said shaft and said drill-spindle, substantially as described.

5. In a drill, the combination, with the hollow base-standard A, having the bearing-hub and flange provided with the annular passage and slot and the hollow pillar C, of the sleeve having the flanged bottom resting on said base-standard and the intermediate raceway and balls, and said sleeve split and provided with ear-pieces and the contracting bolt, and the head E, carried by said sleeve, and the head F, movable and vertically guided on said sleeve and carrying the drill-spindle, the counterbalance-weight within said column, and flexible connections between same and said head F and intermediately supported and guided, the vertical shaft H, having a bearing in the said hub and in the top of said sleeve, the shaft $r$, geared to said vertical shaft, and driving connections between said vertical shaft and the drill-spindle, substantially as described.

6. In a drill, the combination, with a base provided with a cylindrical pillar, of a sleeve supported on said base and encircling and having a bearing on said pillar and rotatable thereon and carrying a head-extension, and the drill-spindle supported on said head-extension in axial parallelism with said pillar, all whereby the spindle may be presented to drill perpendicular to any radial line from said pillar, substantially as and for the purpose described.

7. The combination, with the base-standard A, having the hollow pillar, of the sleeve resting on said base and encircling and rotatable on said pillar and the head E, vertically guided and movable on the said sleeve carrying the drill-spindle, the vertically-apertured counter-weight within the said hollow pillar, and an intermediately-supported flexible connection between the weight and said head E, and the shaft H, vertically extended within said pillar and through said counter-weight and having suitable bearings and driving connections between said shaft and the drill-spindle, substantially as described.

8. In a drill, the combination, with the heads E and F, the latter being vertically movable and having the drill-spindle rotatable but fixed against endwise movement thereon, the pulley and gear $l$, and disk movable as one and freely on the drill-spindle, of the socket $k$ on the head E, and the hub 16 therein, the stud having eccentrically a bearing in the said hub and carrying the gears $m$ and $n$, adapted to engage the gears $l$ and $h$, a device for locking the disk and splined gear to move as one, and an appliance through which to turn the said hub 16, substantially as described and shown, for the purpose specified.

WILLIAM H. BAUSH.

Witnesses:
WM. S. BELLOWS,
J. D. GARFIELD.